April 13, 1948. J. V. WALLGREN ET AL 2,439,592
METHOD OF TEMPORARILY REPAIRING ELECTRIC CABLES DAMAGED BY MOISTURE
Filed Feb. 25, 1943
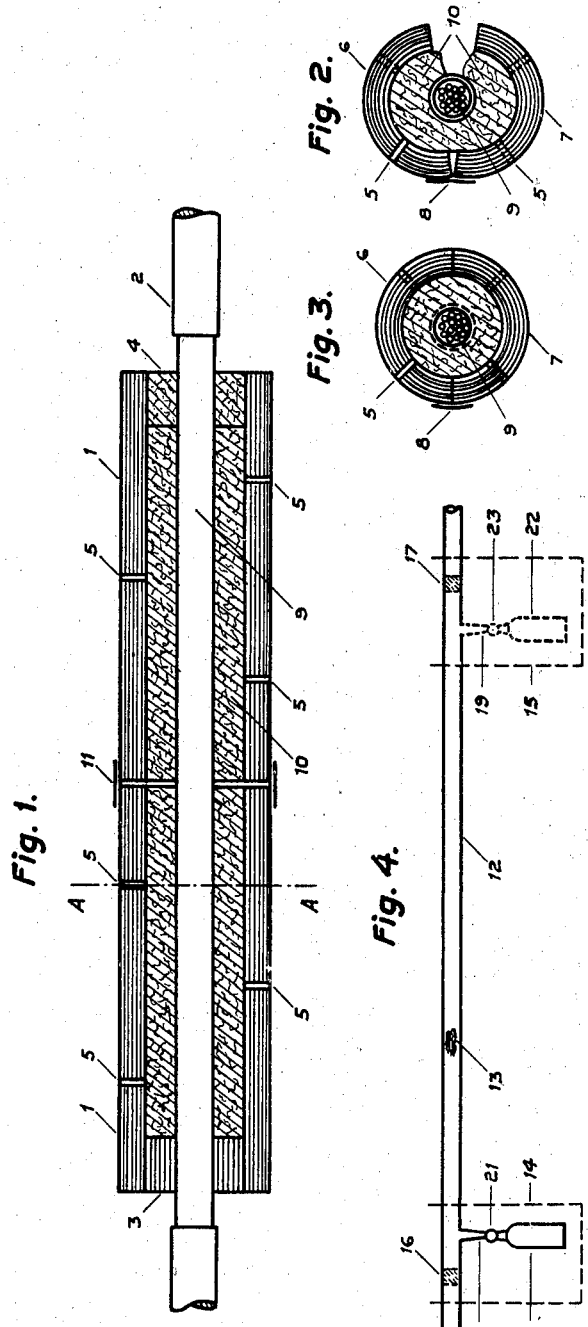
INVENTORS
Johan Valdemar Wallgren
Dag Viktor Ljuslin Linström
their ATT'Y.

Patented Apr. 13, 1948

2,439,592

UNITED STATES PATENT OFFICE 2,439,592

METHOD OF TEMPORARILY REPAIRING ELECTRIC CABLES DAMAGED BY MOISTURE

Johan Valdemar Wallgren and Dag Viktor Ljuslin Lindström, Stockholm, Sweden

Application February 25, 1943, Serial No. 477,158
In Sweden February 17, 1942

7 Claims. (Cl. 154—2.22)

The present invention refers to a method of temporarily restoring to normal operating conditions an electric cable the insulation of which has been damaged by moisture penetrated into the cable core.

The method is particularly suitable to sheathed telephone and telegraph, signal and other cables containing a substantial number of paper insulated conductors. A leak in the lead sheath of such a cable laid in swampy ground will in a short time result in faulty insulation. The resulting damage will often extend so rapidly that all the conductors are put out of order, before there has been time to start repairs of the cable. In such cases the damaged cable section is usually of such a length as to make an exchange of the cable section necessary. Thus, the cable will be out of order and out of traffic during the whole time that repairs take place, unless the damaged section could be made temporarily trafficable.

Heretofore the methods of improving the insulation of water-damaged cable sections all aim at the elimination of water from the cable core by means of introducing hot air or by boiling the insulation with hot paraffin. Both these methods are, however, so slow that in cases where the damage extends over a length of more than one meter, but little time is gained by their use. In cases of yet greater lengths or when the cable is tightly pulled or strung both these known methods are practically worthless.

By means of the present invention the time required for temporarily putting the cable into traffic is cut down to only a fraction of the time needed for the application of any of the above mentioned methods.

The following description refers to an embodiment of the present invention applied to an underground telephone cable of regular size and containing, for example, a hundred quads for long-distance traffic.

The method according to the invention consists in artificially exposing the damaged part of the cable, for example by means of a refrigerant, to a temperature substantially below the freezing point of the penetrated moisture.

When the faulty section of the cable has been located and the surrounding soil has been dug up, the armouring or sheath is removed, and the extent of the damage is established. Then, a heat insulating casing or sleeve is put around the faulty cable section, which casing preferably should cover about half a meter of undamaged cable on each side of the leak. The inside diameter of the casing or sleeve should be about 3 to 4 centimeters greater than the outside diameter of the cable. The space between the casing or sleeve and the cable can then be filled with wood-wool which, however, must not be packed. Instead of wood-wool any other heat insulating material may be used. The end-openings of the casing or sleeve are then packed with heat-insulating material. Holes may be drilled or bored through the insulation casing or sleeve radially towards the center of the cable at intervals of about half a meter. The holes which preferably are applied in zig-zag formation, should not be greater than the nozzle of the injector which is to be used for the introduction of a refrigerant. Through these holes a refrigerant, for example liquid carbon dioxide, liquid air or any other suitable substance of low temperature is then blown into the insulating sleeve around the cable, the beginning preferably being made at the middle of the casing or sleeve. If liquid carbon dioxide is used as refrigerant, about 1 kilogram should be introduced into each hole. This quantity will be sufficient to fill the space between the cable and the casing or sleeve with so-called Dry Ice, because, upon injection, the liquid carbon dioxide immediately freezes to a solid due to its expansion after leaving the nozzle of the injector. The time required for this operation amounts to about 15 seconds for each hole. In about half an hour the whole cable will as a rule be in operating order and remain in such a state for 12 to 15 hours provided the heat-insulation is good.

Instead of injecting a liquid refrigerant, a solid refrigerant, for example carbon dioxide, so-called Dry Ice, may be directly packed between the cable or the cable core and the casing or sleeve.

In performing the method according to the present invention a device can be used as illustrated in the accompanying drawing, in which:

Fig. 1 represents a longitudinal vertical section of a heat insulating sleeve around a faulty cable.

Fig. 2 represents a cross section of the sleeve in only partly closed position around the cable.

Fig. 3 represents a cross section of the same sleeve in place around the cable, said cross-section being taken on line A—A in Fig. 1.

Fig. 4 shows another embodiment of the invention, according to which a gaseous refrigerant is blown through a faulty cable from one cable pit to another.

In Fig. 1 there is shown a casing or sleeve 1 of heat insulating material, for example corrugated air containing pasted layers of container board, cardboard or of other fibrous board or pulp composition. Corrugated pasted paper or pulp composition should preferably be impregnated with some moistureproofing compound.

Instead of paper or pulp composite material with enclosed air, any other heat insulating material can be used, for example asbestos, rock wool, glass wool and the like.

The sleeve can be made in two halves 6 and 7 as shown in Figs. 2 and 3, said halves being united by a flexible hinge 8 or for example a piece of paper or woven material pasted to the two sleeve-halves. The sleeves which should preferably be prepared in the factory ready for use can be manufactured in, for example, 6 feet lengths, and any number of sleeve lengths can be placed around the cable core and united by means of a strong adhesive tape 11 or by means of any sleeve joint of known construction. At both sleeve end sections a ring 3 of the same material as the sleeve proper or a ring 4 of some hardly packed fibrous material, for example wood-wool, glass-wool or asbestos, is placed so as to snugly fit between sleeve 1 and the cable core.

Each sleeve is provided with holes 5 at about 1 foot or 30 centimeters apart and distributed in zig-zag or spirally around the outside circumference of the sleeve. Each hole is located from, for example, 90 to 180° from the previous and from the succeeding hole. These holes serve to receive a nozzle for the injection of a liquid or gaseous refrigerant into the space 10 between the sleeve and the cable core.

The interior of the sleeve can be provided with a porous and fluffy substance, for example cotton, wood wool or the like, which preferably is formed in the shop and pasted to the interior of the sleeve halves, so that when clasped around the cable core a snug fit of very fibrous, porous material exists between the cable core and the sleeve. Of course the porous material can be put in place immediately before using the sleeve at the place of trouble.

When the refrigerant is injected through the holes 5, the refrigerant upon expansion is distributed in the porous material 10 and freezes to solid ice around the cable core. The porous fibers materially help the liquid or gaseous injected refrigerant to solidify at a rapid rate.

After the injection, the holes 5 can be closed with a plug or pasted over to prevent cold to escape.

If solid refrigerant, for example solid air or carbon dioxide, is easily available, the holes 5 are not necessary. In such a case the solid and fluffy refrigerant is directly, by means of a big spoon, distributed in the two halves of the sleeve and well packed around the cable and the fibrous material 10, whereafter the two sleeve halves are closed and held together by means of tape.

As an illustration of traffic time gained by the use of the present method the following average times are given for the different operations in a case like the above mentioned:

|   | Hours |
|---|---|
| 1. Localisation of the damage at the exchange | 1 |
| 2. Time for arriving at the section damaged | 1 |
| 3. Time to dig up two splices | 0.5 |
| 4. Time to open the splices and carry out close measurements | 1 |
| 5. Time to dig up and raise 10 meters of cable | 1 |
| 6. Examination of cable, showing 5 meters to be damaged | 0.5 |
| 7. Time to dig up further length of cable and making preparations for substituting section | 1.5 |
| 8. Splicing of the new cable | 10 |
| Total | 16.5 |

During this time all conductors in the cable are, however, assumed not to have been out of order. Supposing that the first conductors of a communication are out of order at the beginning of the localisation of the trouble, and that all conductors are out of order at the end of the said localisation, and that the connections or communications are successively reestablished during the splicing of the cable section, the average time for the total interruption of traffic will be 11 hours.

In case the present method had been applied immediately after working item 6, all the conductors would have been in operation an hour later, and the total time of traffic interruption would have been limited to 5.5 hours.

The working items 7 and 8, of which item 8 represents a heavy loss of time, could, thus, have been executed while all the respective cable conductors were available for traffic.

The invention refers also to paper or otherwise insulated cables in local underground plants, particularly when such cables are located in conduits between accessible cable pits. If, for example the insulation in a heavy cable of 1000 or more conductors is getting damaged, the street is generally not dug up, and when the damage is located between two cable pits, the faulty cable is generally removed and a new cable section is pulled in and connected instead. Such replacement involves a heavy loss of time, and in the meantime hundreds and perhaps thousands of local stations or trunk lines are out of order.

Fig. 4 shows an embodiment of the invention, according to which the method is applied to cables in underground conduits between splices in ordinary cable pits, without the necessity of digging up the ground at the spot of trouble.

The procedure is then the following. Holes 18 and 19 are made in the lead sheath of the out-of-order cable at each cable pit. In one pit 14 a gaseous cooling medium, for example dry cold air, liquid air evaporated, liquid or solid carbon dioxide evaporated, or a mixture of air and any of the above mentioned refrigerants, is introduced under pressure through the said hole and conducted along and around the core of the section of the faulty cable 12, whereby the previously existing air in the cable is blown off through the hole 19 at the other cable pit. If the trouble has been located before the cable is filled with water the dry cold air or gas passing through the moistened insulation will freeze the moisture in said insulation and thus restore the insulation to traffic operating values.

Even if the trouble is heavy and the cable is partly filled with water, cold air or gas of low temperature can be pumped in from both sides of the damaged section through the holes in the respective cable pits. In such a case the air can escape through the leak 13 in the lead sheath at the place of trouble, and the water at the place of trouble will gradually freeze to solid ice, as the gas bubbles pass through it, thus restoring the insulation resistance to normal.

In order not to loose pressure to other sections of the cable, it is convenient previously to the injection of a cold gas to apply in known way compound plugs 16 and 17 of, for example, paraffin and beeswax to the adjacent sections of the cable in order to prevent the cooling medium extending to sections not wanted.

If the liquid air or liquid carbon dioxide is stored in portable receptacles 20 and 22 under high pressure, the necessary reduction valves 21 and 23 should be so dimensioned that the correct temperature of the gas or of the mixture of gas and ordinary cold air is obtained without ice being formed at the valve openings.

In this embodiment of the invention no casing or sleeve around the cable at the place of trouble is needed, because the cold gas is introduced directly around the core of the cable and the outside lead sheath serves as insulating sleeve or casing.

As soon as the insulating resistance has risen to normal values and traffic has been restored, a new cable section can be laid and spliced at the respective pits without further interruption of traffic.

The invention is not limited to long distance or local telephone or telegraph cables herein described, but can be applied to all kinds of electrical cables, power cables included.

In the case of power cables the splicing can generally not be made under tension, but service can nevertheless be maintained for longer or shorter periods of time, particularly if a new cable has to be put in instead of the damaged one, during which time and during the preparation of splicing the frozen cable will maintain a valuable service.

Thus, the method according to this invention makes possible a total resumption of traffic, which has been interrupted on account of damaged insulation, in about half the time required by the methods used heretofore. Especially in the case of damages due to moisture in the expensive long distance cables transmitting toll telephone and telegraph traffic, lots of money can be saved by applying the present method of freezing the cable.

The present method should be particularly suitable to clear quickly troubles of the kind described in aerial cables which are very frequently exposed to traffic interruptions, due to repeated swinging and movements of the cables when heavy wind is blowing.

Apart from the gain in time and money in reestablishing interrupted long distance traffic, there are other advantages that hardly can be estimated in money, such as the facilitation of official communications which are of the utmost importance to the defense of the country, its governing institutions and the economic life of the country.

The method of applying the invention can naturally be modified and varied and be put in action with means different from the above described embodiments without abandoning the general idea of the invention.

Having now particularly described and ascertained the nature of our said invention and in what manner the same is to be performed, we declare that what we claim is:

1. The method of temporarily restoring to normal operating value the insulating resistance of conductors insulated with fibrous material in electric metal-sheathed cables out of order due to moisture having penetrated into said fibrous material through a leak in the cable sheath, which method consists in removing the outside cable sheath from the damaged part of the cable and directly exposing the said moistened fibrous insulating material to a solid refrigerant of a temperature substantially below the freezing point of the penetrated moisture.

2. The method of temporarily restoring to normal operating value the insulation resistance of conductors in a metal-sheathed electric cable out of order due to moisture having penetrated into the insulation of said conductors through a leak in the cable sheath, which method consists in removing the outside cable sheath from the damaged part of the cable and applying solid carbon dioxide to the thus exposed cable core free from the cable sheath and to the said insulation.

3. The method of temporarily restoring to normal operating value the insulation resistance of conductors in a metal-sheathed electric cable out of order due to moisture having penetrated through a leak in the cable sheath into the insulation of the conductors, which method consists in removing the outside cable sheath from the damaged part of the cable, applying a heat insulating sleeve around the thus exposed cable core free from the cable sheath, and applying between the cable core and the said heat insulating sleeve a refrigerant which enters into contact with the moistened insulation of the conductors in the form of a solid having a temperature substantially below that of the freezing point of the said penetrated moisture.

4. The method of temporarily restoring to normal operating values the insulation resistance of electrical conductors of a metal-sheathed communication cable out of order due to moisture having penetrated through a leak in the cable sheath, which method consists in removing the outside cable sheath from the damaged part of the cable, applying a fibrous and porous substance around the damaged cable core free from the cable sheath, and injecting a compressed fluid refrigerant into said fibrous and porous substance and into the cable core, in order upon solidification by expansion of said compressed refrigerant to expose the said penetrated moisture to a temperature below its freezing point.

5. The method of temporarily restoring to normal operating values the insulation resistance of conductors of a metal-sheathed electrical cable out of order due to moisture having penetrated through a leak in the cable sheath, which consists in removing the outside cable sheath from the damaged part of the cable, applying a fibrous, porous and heat-insulating substance around the damaged cable core, applying a heat insulating casing, provided with holes radially directed towards the cable core, around said fibrous and porous heat-insulating substance, and injecting successively through said holes a compressed fluid refrigerant into said fibrous and porous substance around and into the cable core for the solidification of said compressed fluid refrigerant upon expansion of same into the said porous substance and cable core.

6. The method of temporarily restoring to normal operating value the insulation resistance of the conductors of a metal-sheathed electric cable out of order due to moisture having penetrated through a leak in the cable sheath, which method consists in removing the outside sheath from the damaged part of the cable, applying around the thus exposed cable core a heat insulating casing of an inner diameter greater than the outer diameter of the core, and applying a solid refrigerant between the cable core and said casing, in order to freeze said penetrated moisture.

7. The method of temporarily restoring to normal operating value the insulation resistance of the conductors of a metal-sheathed electric cable out of order due to moisture having penetrated through a leak in the cable sheath, which method consists in removing the outside cable sheath from the damaged part of the cable, applying a fibrous and porous substance around the said damaged cable core free from the cable sheath, applying a heat insulating casing around said fibrous and porous substance, and injecting a fluid refrigerant into the said fibrous and porous substance and into the cable core, in order to lower the temperature of the cable core and of said penetrated moisture below its freezing point.

DAG VIKTOR LJUSLIN LINDSTRÖM.
JOHAN VALDEMAR WALLGREN.

REFERENCES CITED

The following references are of record in the file of this patent:

UNITED STATES PATENTS

| Number | Name | Date |
| --- | --- | --- |
| Re. 11,865 | Tesla | Oct. 23, 1900 |
| 1,613,725 | Sabin | Jan. 11, 1927 |
| 1,707,324 | Schlecker | Apr. 2, 1929 |
| 1,734,209 | Huffine | Nov. 5, 1929 |
| 2,320,506 | Bennett et al. | June 1, 1943 |